United States Patent
Schörghuber et al.

(10) Patent No.: US 11,648,619 B2
(45) Date of Patent: May 16, 2023

(54) METHOD AND DEVICE FOR MAKING A WORKPIECE SURFACE OF A METAL WORKPIECE

(71) Applicant: Fronius International GmbH, Pettenbach (AT)

(72) Inventors: Manfred Schörghuber, Wels (AT); Andreas Waldhör, Rettenbach (AT); Manuel Mayer, Edt bei Lambach (AT)

(73) Assignee: Fronius International GmbH, Pettenbach (AT)

(*) Notice: Subject to any disclaimer, the term of this patent is extended or adjusted under 35 U.S.C. 154(b) by 606 days.

(21) Appl. No.: 16/499,981

(22) PCT Filed: Apr. 3, 2018

(86) PCT No.: PCT/EP2018/058490
§ 371 (c)(1),
(2) Date: Oct. 1, 2019

(87) PCT Pub. No.: WO2018/185101
PCT Pub. Date: Oct. 11, 2018

(65) Prior Publication Data
US 2021/0101218 A1 Apr. 8, 2021
US 2022/0250181 A2 Aug. 11, 2022

(30) Foreign Application Priority Data

Apr. 3, 2017 (EP) .................................. 17164597

(51) Int. Cl.
*B23H 9/06* (2006.01)
*B23H 1/00* (2006.01)
*B23K 9/29* (2006.01)

(52) U.S. Cl.
CPC ................. *B23H 9/06* (2013.01); *B23H 1/00* (2013.01); *B23K 9/295* (2013.01)

(58) Field of Classification Search
CPC .... B23K 9/235; B23K 31/00; B23K 2101/00; B23H 9/06; B23H 1/00; B41M 5/24; B25H 7/04
See application file for complete search history.

(56) References Cited

U.S. PATENT DOCUMENTS

| | | | |
|---|---|---|---|
| 3,506,801 A * | 4/1970 | Smith ...................... | B23K 9/04 219/76.14 |
| 2011/0220619 A1* | 9/2011 | Mehn .................... | G01B 11/002 219/121.48 |

(Continued)

FOREIGN PATENT DOCUMENTS

| CN | 203863195 U | 10/2014 |
|---|---|---|
| CN | 105593874 A | 5/2016 |

(Continued)

OTHER PUBLICATIONS

International Search Report corresponding to international application No. PCT/EP2018/058490 dated Jul. 10, 2018. (12 pages).

*Primary Examiner* — Brian W Jennison
(74) *Attorney, Agent, or Firm* — Maginot, Moore & Beck LLP

(57) ABSTRACT

Method and device for marking a workpiece surface (2A) of a metal workpiece (2), in which a welding torch (3) comprising a welding wire electrode (4) is guided along the workpiece surface (2A) to be marked and meanwhile a wire end (4A) of the welding wire electrode (4) is moved towards and away from the work-piece surface (2A) to be marked, wherein an electric voltage (U) present at the welding wire electrode (4) and/or an electric current (I) flowing through the welding wire electrode (4) bring about electric sparks, which bring about material removal and/or material alteration at the workpiece surface (2A) of the metal workpiece (2) to mark the workpiece surface (2A).

20 Claims, 4 Drawing Sheets

(56) References Cited

U.S. PATENT DOCUMENTS

2015/0083702 A1* 3/2015 Scott .................. B23K 28/00
219/148
2016/0259976 A1* 9/2016 Halasz ................ G06V 10/751

FOREIGN PATENT DOCUMENTS

| CN | 106312243 A | 1/2017 |
|---|---|---|
| EP | 0 005 134 A2 | 10/1979 |
| FR | 2 556 639 A1 | 6/1985 |
| KR | 20110001638 A | 1/2011 |

* cited by examiner

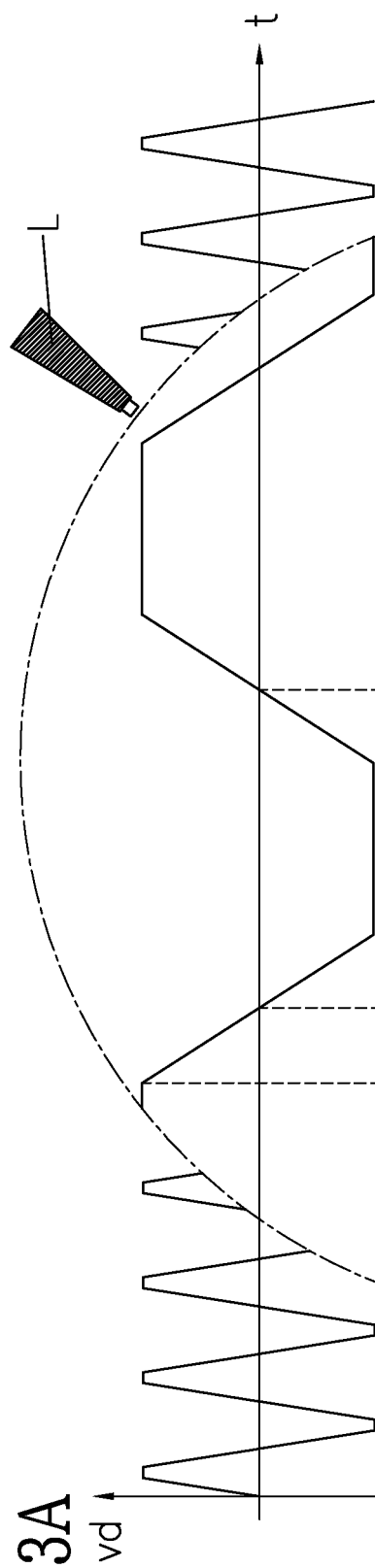
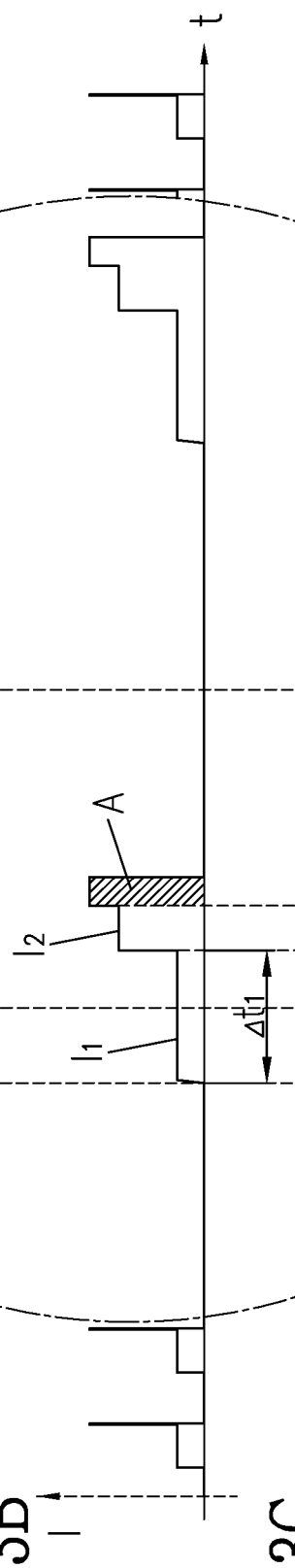
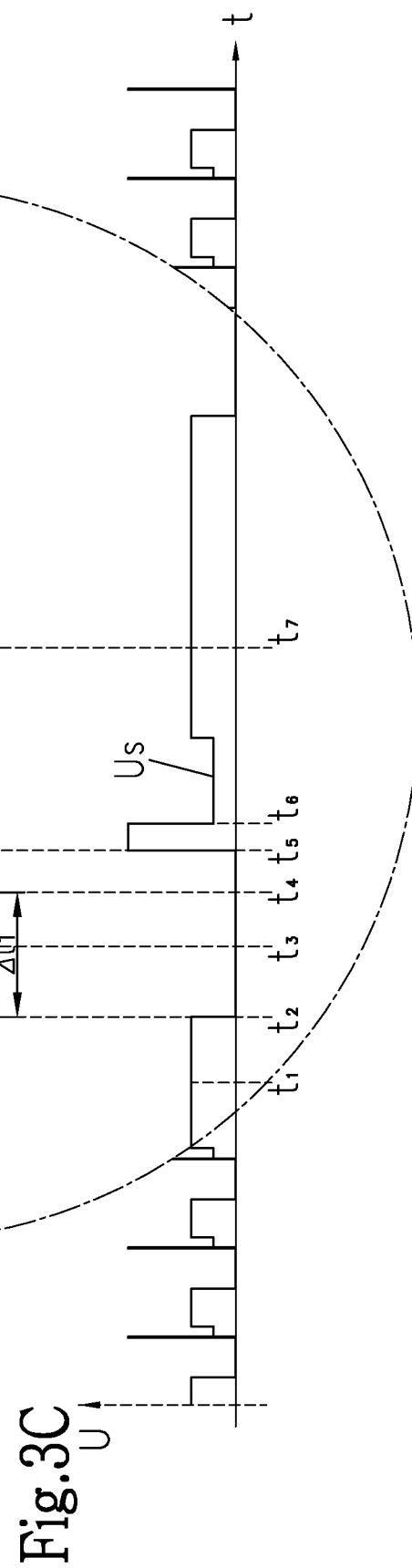

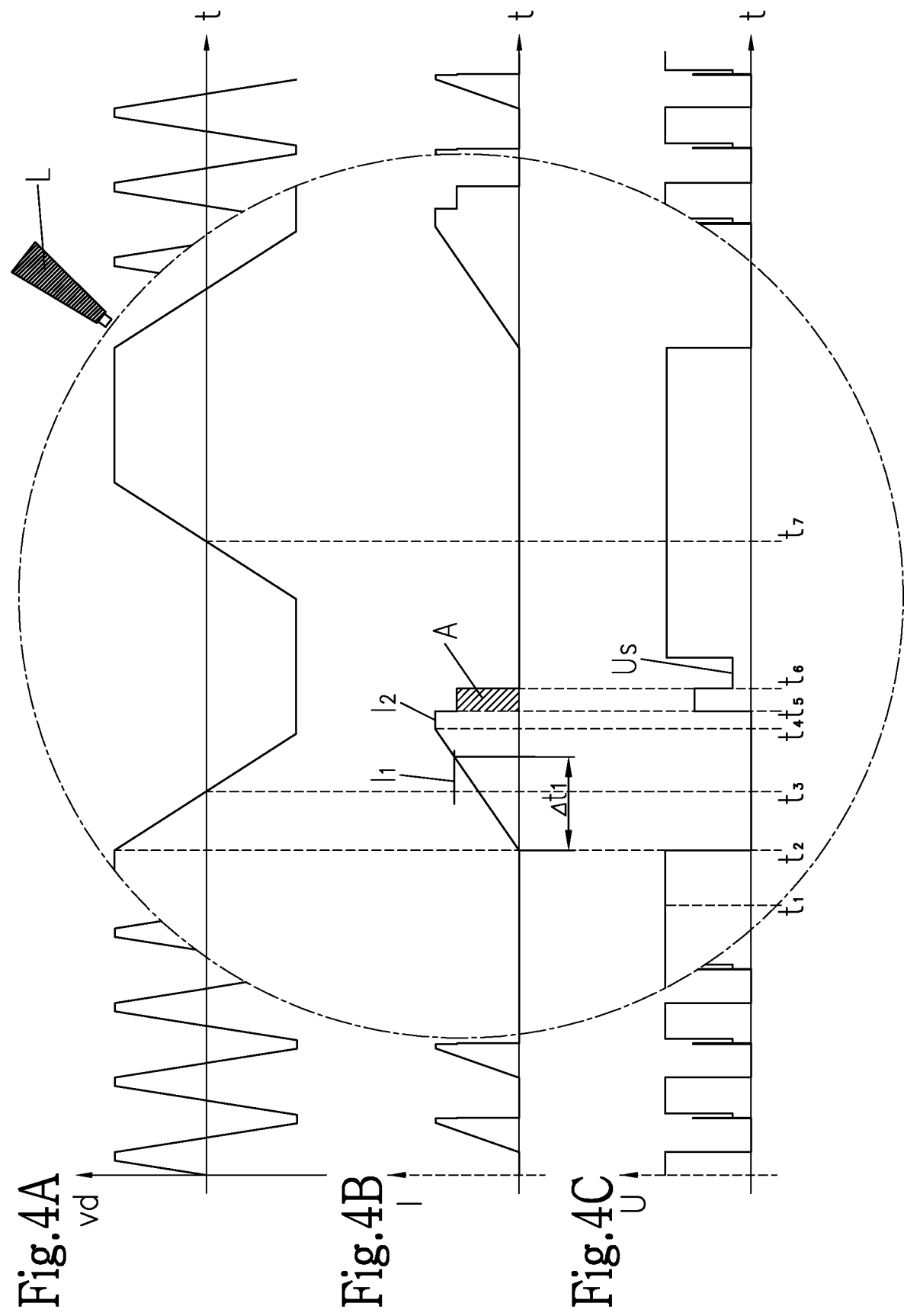

METHOD AND DEVICE FOR MAKING A WORKPIECE SURFACE OF A METAL WORKPIECE

PRIORITY CLAIM

This application is a 35 U.S.C. 371 National Stage application of PCT/EP2018/058490, filed Apr. 3, 2018, which claims priority to European Application No. EP 17164597.1, filed on Apr. 3, 2017. The entire contents of the above-mentioned patent applications are incorporated herein by reference as part of the disclosure of this U.S. application.

BACKGROUND

The invention relates to a method and a device for marking a workpiece surface of a metal workpiece, in particular of a metal workpiece which is subsequently welded.

There are various conventional methods for marking articles. A component surface can be marked by material removal, material application or material alteration. For example, material on a component surface can be removed by electrical, chemical or laser-based marking methods so as to identify the component in question. FR 2 556 639 A1 describes an example electric method for enscribing workpieces.

In many application scenarios, marking is also useful for workpieces or components on which a welding process is to be carried out. However, conventional welding systems or welding methods do not provide the option of marking the workpieces before or after carrying out the welding process without additional technical outlay. An example welding system is described in US 2011/0220619 A1.

SUMMARY OF THE DISCLOSURE

Therefore, an object of the present invention is to provide a method and a device which make it possible to mark the workpiece surface of a metal workpiece for which welding is to be carried out, without additional outlay.

The invention accordingly provides a method for marking a workpiece surface of a metal workpiece in which a welding torch comprising a welding wire electrode is guided along the workpiece surface to be marked and meanwhile a wire end of the welding wire electrode is moved towards and away from the workpiece surface to be marked, wherein an electric voltage present at the welding wire electrode and/or an electric current flowing through the welding wire electrode bring about electric sparks, which bring about material removal and/or material alteration at the workpiece surface of the metal workpiece to mark the workpiece surface.

In one possible embodiment of the method according to the invention, the welding wire electrode consists of an additive material which can be melted during a welding process.

In a further possible embodiment of the method according to the invention, the wire end of the welding wire electrode is repeatedly moved towards the workpiece surface until an electric short circuit with the metal workpiece occurs and subsequently moved away from the workpiece surface, an electric spark being produced each time the electric short circuit is interrupted and bringing about material removal and/or material alteration in a point-based manner on the workpiece surface of the metal workpiece to generate a marking point.

In a further possible embodiment of the method according to the invention, the marking points generated at the workpiece surface of the metal workpiece form a marking path which is visible in the workpiece surface.

In a further possible embodiment of the method according to the invention, the electric voltage present at the welding wire electrode and/or the electric current flowing through the welding wire electrode are controlled by a welding power source of a welding system, which power source is connected to the welding wire electrode, to adjust the material removal and/or material alteration brought about at the workpiece surface of the metal workpiece.

In a further possible embodiment of the method according to the invention, a predetermined first current level is not exceeded for a predetermined first time period after the short circuit onset, so as to prevent the wire electrode from sticking. Preferably, the first time period is greater than 400 µs and the first current level is less than 30 A.

In a further possible embodiment of the method according to the invention, which is implemented by lifting off the welding wire electrode, the current is set to at least a predetermined second current level so as to ensure that a spark is ignited when the short circuit is interrupted. In this context, the instant of the short circuit interruption can be predetermined on the basis of the movement profile of the welding wire electrode. Preferably, this second current level is greater than 10 A.

In a further possible embodiment of the method according to the invention, after the short circuit is interrupted, the spark is maintained in accordance with a predetermined current and time profile so as to influence the manifestation of the marking point. The current and time profile can be determined in greater detail by the area in the graph of the current progression over time. Preferably, the predetermined current-time area is between 100 µAs and 20 µAs.

In an alternative embodiment of the method according to the invention, after the short circuit interruption a predetermined voltage sufficient for forming a spark is set between the welding wire electrode and the workpiece. In the course of the movement of the welding wire electrode away from the workpiece surface, the air gap increases, and the spark can be extinguished. In this context, the manifestation of the marking point can be adjusted by way of the voltage level and the movement speed or movement profile of the welding wire electrode. Preferably, the voltage is between 10 V and 20 V.

In a further possible embodiment of the method according to the invention, a movement profile and/or movement frequency of the wire end, which is moveable towards and away from the workpiece surface to be marked, of the welding wire electrode is adjusted.

In a further possible embodiment of the method according to the invention, a movement speed and/or movement path of the welding torch, with which the wire end of the welding wire electrode is guided along the workpiece surface to be marked of the metal workpiece, is adjusted.

In a further possible embodiment of the method according to the invention, the marking points and/or marking paths generated at the workpiece surface of the metal workpiece are used for displaying data, in particular for labelling the workpiece and/or for identifying the workpiece with a code, in particular a QR code.

In a further possible embodiment of the method according to the invention, during the marking the wire end, which moves back and forth, of the welding wire electrode is guided along a programmed target progression of a weld seam which is to be produced in a subsequent welding process.

In a further possible embodiment of the method according to the invention, a deviation between the actual progression of a marking path and the target progression of the weld seam is measured for quality control and/or readjustment of welding torch guidance.

In a further possible embodiment of the method according to the invention, a contrast level of a marking path produced on the workpiece surface is adjusted by altering marking parameters, which include the voltage and/or current level controlled by a welding power source, the movement profile and/or movement frequency of the wire end of the welding wire electrode, and/or the movement speed of the welding torch with which the wire end of the welding wire electrode is guided along the workpiece surface.

In a further possible embodiment of the method according to the invention, the marking parameters used during the marking of the workpiece surface are stored in a data store of the welding system as a dataset and read out from the data store of the welding system again for a subsequent marking process.

In a further possible embodiment of the method according to the invention, for different contrast levels of a marking path formed on the workpiece surface and/or for different materials of the metal workpiece and/or for different welding wire electrodes an associated dataset of suitable marking parameters is read out from the data store of the welding system to mark the workpiece surface of the metal workpiece.

In a further possible embodiment of the method according to the invention, the workpiece surface is protected from oxidation by supplied protective gas during the marking of the workpiece surface of the metal workpiece.

In a further possible embodiment of the method according to the invention, during the marking of the workpiece surface the welding torch is automatically guided by a robot arm in accordance with a programmed target progression of a weld seam which is to be produced in a subsequent welding process.

In a further alternative embodiment of the method according to the invention, the welding torch is hand-guided during the marking of the workpiece surface, in particular to label the workpiece surface.

The invention further provides a marking device for marking a workpiece surface of a metal workpiece, wherein a wire end of a meltable welding wire electrode of a welding system can be guided along the workpiece surface to be marked of the metal workpiece, and meanwhile the marking device is suitable for moving the wire end of the welding wire electrode towards and away from the workpiece surface to be marked so as to produce electric sparks, which bring about material removal and/or material alteration at the workpiece surface of the metal workpiece to mark the workpiece surface.

In a possible embodiment of the marking device according to the invention, the welding wire electrode is connected to a welding power source of the welding system, which power source controls an electric voltage present at the welding wire electrode and/or an electric current flowing through the welding wire electrode to adjust the material removal and/or material alteration brought about at the workpiece surface of the metal workpiece.

In a further possible embodiment of the marking device according to the invention, the wire end of the welding wire electrode protrudes from a guided welding torch of the welding system and can be moved back and forth, during the marking of the workpiece surface, with an adjustable movement profile and/or adjustable movement frequency with respect to the workpiece surface to be marked.

The marking device according to the invention is preferably used to simulate a subsequent welding process using a visual and/or acoustic signal.

The invention also provides a welding system comprising a marking device for marking a workpiece surface of a metal workpiece, wherein a welding torch of the welding system comprising a meltable welding wire electrode can be guided along the workpiece surface to be marked of the metal workpiece, and meanwhile the marking device is suitable for moving a wire end of the meltable welding wire electrode towards and away from the workpiece surface to be marked so as to produce electric sparks, the sparks bringing about material removal and/or material alteration at the workpiece surface of the metal workpiece to mark the workpiece surface.

Advantageously, the welding system according to the invention has a push-pull torch, making it possible to move the welding wire electrode back and forth at a movement frequency of over 50 Hz and up to 300 Hz. This push-pull torch may contain a wire buffer store, which makes this high movement frequency possible, in the region of the burner.

In a preferred embodiment of the welding system according to the invention, the meltable welding wire electrode is moved back and forth almost vertically.

In a further possible embodiment of the welding system, the welding system is a CMT (cold metal transfer) welding system.

DESCRIPTION OF THE DRAWINGS

Hereinafter, possible embodiments of the method according to the invention and device according to the invention for marking a workpiece surface of a metal workpiece are described in greater detail with reference to the accompanying drawings, in which:

FIG. 3A, 3B, 3C are graphs over time to illustrate the functionality of an embodiment of a method according to the invention for marking a workpiece surface of a metal workpiece;

FIG. 4A, 4B, 4C are graphs over time to illustrate the functionality of an alternative embodiment of a method according to the invention for marking a workpiece surface of a metal workpiece.

DETAILED DESCRIPTION

Figure 1:
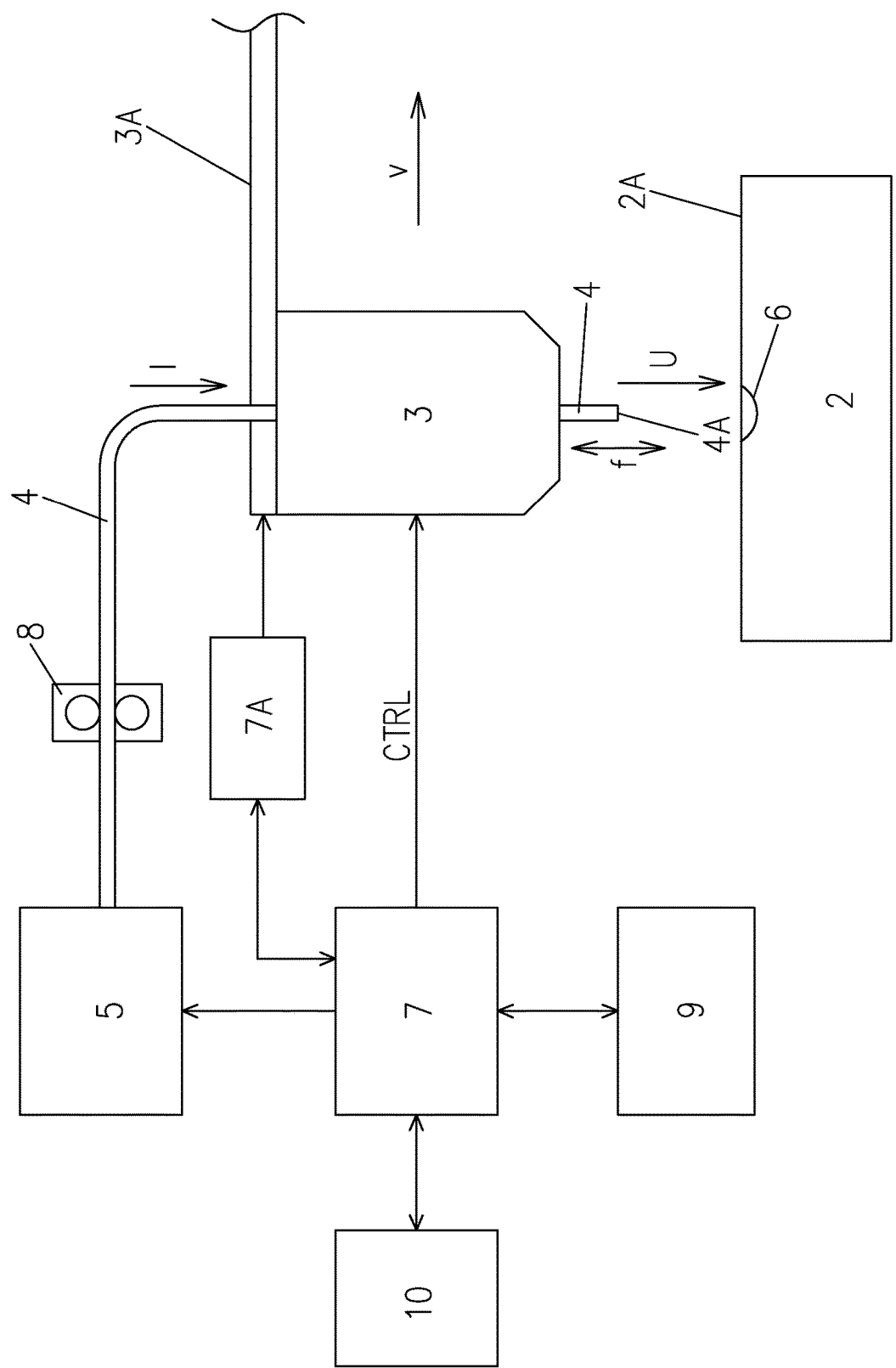
FIG. 1 is a schematic drawing of a possible embodiment of a welding system according to the invention to illustrate a marking process on a workpiece surface of a metal workpiece.

As can be seen from the schematic drawing of FIG. 1, in the embodiment shown a welding system 1 according to the invention has a marking device for marking a workpiece surface 2A of a metal workpiece 2. In this context, the metal device is suitable for guiding a welding torch 3 comprising a meltable welding wire electrode 4 of the welding system 1 along a workpiece surface 2A to be marked of the metal workpiece 2. In this context, a wire end 4A of the meltable welding wire electrode 4 is moved towards and away from the workpiece surface 2A to be marked of the workpiece 2 to produce electric sparks. These electric sparks bring about material removal and/or material alteration at the workpiece surface 2A of the metal workpiece 2 for marking at the workpiece surface 2A thereof. In this context, the material alteration may be brought about for example by surface fusing or by oxidising the workpiece surface 2A of the metal workpiece 2. An electric voltage U is present at the welding wire electrode 4, as is shown in FIG. 1. Further, an electric current I which originates from a welding power source 5 of the welding system 1 flows through the welding wire electrode 4. The electric voltage U present at the welding wire electrode 4 and the electric current I flowing through the welding wire electrode 4 produce electric sparks, which lead to material removal at the workpiece surface 2A of the metal workpiece 2. The wire end 4A of the welding wire electrode 4 is repeatedly moved towards the workpiece surface 2A until an electric short circuit with the metal workpiece 2 occurs and subsequently moved away from the workpiece surface 2A, an electric spark being produced each time the electric short circuit is interrupted and bringing about material removal and/or material alteration in a point-based manner on the workpiece surface 2A of the metal workpiece 2 to generate a marking point 6. The marking points 6 generated at the workpiece surface 2A of the metal workpiece can form a marking path visible in the workpiece surface 2A of the workpiece 2. The resulting marking may be composed of a plurality of marking paths. The marking may also for example be widened if the marking path has an oscillation or a zigzag movement. Likewise, slightly offset circular, elliptical or meandering paths can be used to widen the marking. The welding current source 5 of the welding system 1 controls an electric voltage U present at the welding wire electrode 4 and/or an electric current I flowing through the welding wire electrode 4 to adjust the material removal brought about at the workpiece surface 2A of the metal workpiece 2 and thus the extent of the produced marking point 6.

As is schematically shown in FIG. 1, the welding system 1 has a control system 7, which controls a movement profile and/or movement frequency of the wire end 4A, which can be moved towards and away from the workpiece surface 2A to be marked, of the welding wire electrode 4. The control system 7 of the welding system 1 further controls the welding current source 5 of the welding system 1 to adjust the electric voltage U present at the welding wire electrode and/or to adjust the electric current I flowing through the welding wire electrode 4.

In this context, during a marking process or during a marking mode of operation of the welding system 1 the electric voltage U and the electric current I flowing through the welding wire electrode 4 are set in such a way that electric sparks form and bring about material removal and/or material alteration at the workpiece surface 2A of the metal workpiece 2, but there is no melting of the melting welding wire electrode 4.

In one possible embodiment of the welding system 1 schematically shown in FIG. 1, the welding torch 3 is guided automatically by a robot arm 3A during a marking process for marking the workpiece surface 2A. The movement speed of the welding torch 3, with which the wire end 4A of the welding wire electrode 4 is guided along the workpiece surface 2A to be marked of the metal workpiece 2, is adjustable and can be controlled by a control system 7A of the robot arm 3A. Further, the control system 7 of the welding system 1 may be communicatively connected to the control system 7A of the robot arm 3A, for example so as to adapt the movement profile of the back-and-forth movement of the wire end 4A to the movement speed of the welding torch 3. Alternatively, it is conceivable that the functions of the control system 7 and the control system 7A are implemented jointly in a superordinate control system (not shown in greater detail).

In one possible embodiment of the welding system 1 schematically shown in FIG. 1, during a marking process for marking the workpiece surface 2A the welding torch 3 is guided automatically by a robot arm 3A in accordance with a programmed target progression of a weld seam which is to be produced in a subsequent welding process. In this context, the control system 7A controls the movement of the welding torch 3 in accordance with the programmed target progression. The wire end 4A of the welding wire electrode 4 protrudes from the guided welding torch 3 of the welding system 1, and is moved back and forth, during the marking process of the workpiece surface 2A, with an adjustable movement profile and/or adjustable movement frequency f with respect to the workpiece surface 2A to be marked.

In one possible embodiment, a deviation between an actual progression of the marking path generated in the workpiece surface 2A and a target progression of the weld seam is measured for quality control and/or readjustment of a welding torch guidance. In another embodiment, a measurement device for measuring a deviation between the actual progression of a marking path and the target progression of a weld seam may be provided so as to be able to determine and evaluate the difference automatically by means of a superordinate control system.

In the embodiment shown in FIG. 1, the welding system 1 further has a wire advancement apparatus 8, which is for feeding the welding wire 4. A highly dynamic wire drive at the welding torch 3 is configured to a high movement speed and brings about a high-frequency back-and-forth movement of the welding wire electrode 4 at a movement frequency f. In this context, the wire drive of the welding torch 3 is configured to a high movement speed. By contrast, the welding wire electrode 4 which melts during the welding operation is fed by means of the wire advancement apparatus 8.

In one possible embodiment of the welding system 1 according to the invention, a contrast level of a marking path produced on the workpiece surface 2A and composed of marking points 6 is adjusted to alter marking parameters. In one embodiment, these marking parameters include the voltage and/or current level controlled by the welding power source 5, the movement profile and/or movement frequency of the welding wire electrode 4, and/or the movement speed of the welding torch 3 with which the wire end 4A of the welding wire electrode 4 is guided along the workpiece surface 2A of the workpiece 2. In a possible embodiment of the method according to the invention, the marking parameters used during the marking of the workpiece surface 2A may be stored in a data store 9 of the welding system 1 as a dataset and read out from the data 9 store of the welding system 1 again by the control system 7 for a subsequent marking process. In one possible embodiment of the welding system 1 according to the invention, it has a user interface 10 which makes it possible to set various marking parameters for the marking process manually. In one possible embodiment, a welder of the welder system 1 has the option to set various marking parameters manually using the user interface 10 and to carry out a marking process. If for example the user is satisfied with the produced marking path, he can store the marking parameters used in the data store 9 of the welding system 1 as a dataset and reuse them for a subsequent marking process. Further, the data store 9 may contain various preconfigured datasets so as to produce marking paths having different contrast levels. For different contrast levels of a marking path formed at the workpiece surface 2A and/or for different materials of the metal workpiece 2 and/or for different welding wire electrodes 4, an associated dataset of suitable marking parameters can be stored in the data store 9 and be read out by the control unit 7 to mark the workpiece surface 2A of the metal workpiece 2 in a marking process. In one possible embodiment, the user interface 10 of the welding system 1 has a display unit, which displays to the user or welder the set marking parameters which are being used for the marking process.

In a further possible embodiment of the welding system 1 according to the invention, the welder or user can additionally input data or information regarding the material of the metal workpiece via the user interface 10. Depending on the inputted material of the workpiece 2, a suitable dataset of marking parameters therefor can be read out from the data store 9 and used for the marking process. In one possible embodiment of the welding system 1 according to the invention, the workpiece surface 2A is protected against oxidation by supplied protective gas during the marking of the workpiece surface 2A of the metal workpiece 2. In one possible embodiment, the user or welder of the welding system 1 can adjust, for example activate or deactivate, the supply of protective gas during the marking process via the user interface 10. In one possible embodiment of the welding system 1 according to the invention, the welding system 1 is a metal protective gas welding system in which a metal active gas (MAG) method or metal inert gas (MIG) method is employed.

In the welding system 1 according to the invention, as shown schematically in FIG. 1, the highly dynamic reversing welding wire electrode 4 makes it possible to place marking points 6 in a high number with slight material removal and/or a material alteration. The successive marking points 6 result in a visible marking path in the workpiece surface 2A of the workpiece 2.

The welding wire end 4A of the welding wire electrode 4 forms a tool centre point TCP of the welding system 1. The tool centre point TCP forms a point at the end of a kinematic chain, and forms a target variable for which positioning requirements resulting from the machining process apply.

In one possible embodiment of the welding system 1 according to the invention, the welding torch 3 is attached to a robot arm 3A, which during the marking process is automatically guided in accordance with a programmed target progression of a weld seam which is to be produced in a subsequent welding process. This target progression preferably relates to the progression of the tool centre point TCP, in other words to the target progression of the welding wire end 4A of the welding wire electrode 4. The actual TCP can differ from a target TCP or ideal TCP as a result of a wire curvature brought about by the wire conditioning. Other influences, such as thermal expansion of the robot arm and a play in movable parts, can also lead to a deviation in the actual TCP.

Using the method according to the invention, the actual TCP can be visualised on the workpiece surface 2A by applying a marking path.

In an alternative embodiment of the welding system 1 according to the invention, the welding torch 3 is hand-guided during the marking of the workpiece surface 2A, in particular for labelling the workpiece surface 2A. The electric sparks produced during the marking process produce visible marking paths, which can be used for labelling the workpiece surface 2A, in the workpiece surface 2A. For example, in this way a user or welder can inscribe in the workpiece surface 2A a piece of data which specifies the time of the marking or welding. For example, the user or welder may also write a code or signature on the workpiece surface 2A of the workpiece 2, so that it can be established who carried out the welding.

In a further possible embodiment, the marking device is used to simulate a subsequent welding process using a visual and/or acoustic signal. In this context, an acoustic signal of the movement frequency simulates welding parameters of the subsequent welding process. In this context, individual welding parameters, such as welding speed, torch positioning, melting power, length of the free wire end (stick-out) or correction factors can be made audible. For this purpose, a corresponding change in the welding parameter may also take place in the movement frequency of the back-and-forth movement of the welding wire end 4A, so as to achieve the acoustic signal change. The subsequent welding process can advantageously be visualised, since the electric sparks produced in the marking process do not glow as brightly as the arc occurring during the actual welding process. The electric sparks occurring during the marking process can be observed directly by the user. In this embodiment, the welding system 1 of the marking device according to the invention thus offers a training apparatus for training welders. In this embodiment, the welding system 1 can be used for teaching people, since a welding process can be acoustically and/or optically simulated.

In a further possible embodiment of the welding system 1 according to the invention, the welding system is a CMT (cold metal transfer) welding system suitable for CMT welding. In this embodiment, once the marking process is complete a welding process takes place. For example, the welding process is a CMT welding process; in this context, the welding power source 5 preferably provides a pulsing welding current, and additionally the welding wire electrode 4 is moved back and forth at a high frequency. As soon as the welding power source 5 detects a short circuit, a rearward movement of the welding wire electrode 4 starts with a simultaneously reduced welding current. In this context, a drop formed in the preceding arc phase is released from the welding wire electrode 4, without splashes occurring. The formed welding drop is released from the welding wire electrode 4 more easily as a result of the wire movement, and thus promotes virtually splash-free welding. In one possible embodiment, the reversing welding wire electrode 4 can be moved back and forth at a relatively high frequency of more than 50 Hz. After the welding drop is released, the welding wire electrode 4 is guided forwards again, and the cycle begins afresh. The CMT welding method is suitable for all conventional weldable metals such as steel, aluminium, CrNi steels, and also for mixed compounds such as steel with aluminium.

Before or after the CMT welding process is carried out, the workpiece surface 2A of the metal workpiece 2 to be processed can be marked using the marking method according to the invention without additional hardware outlay.

In one possible embodiment of the welding system 1 according to the invention, marking points 6 or marking paths for displaying data are generated on the workpiece surface 2A of the metal workpiece 2. These data comprise for example a readable code, in particular a QR code. In this way, in a simple manner, relevant data relating to the processed workpiece 2 or the machining process can be permanently associated with the workpiece 2 and subsequently read out using a read apparatus. The data which are read out may for example be used in the quality control or maintenance of a component which includes the workpiece 2.

Figure 2:
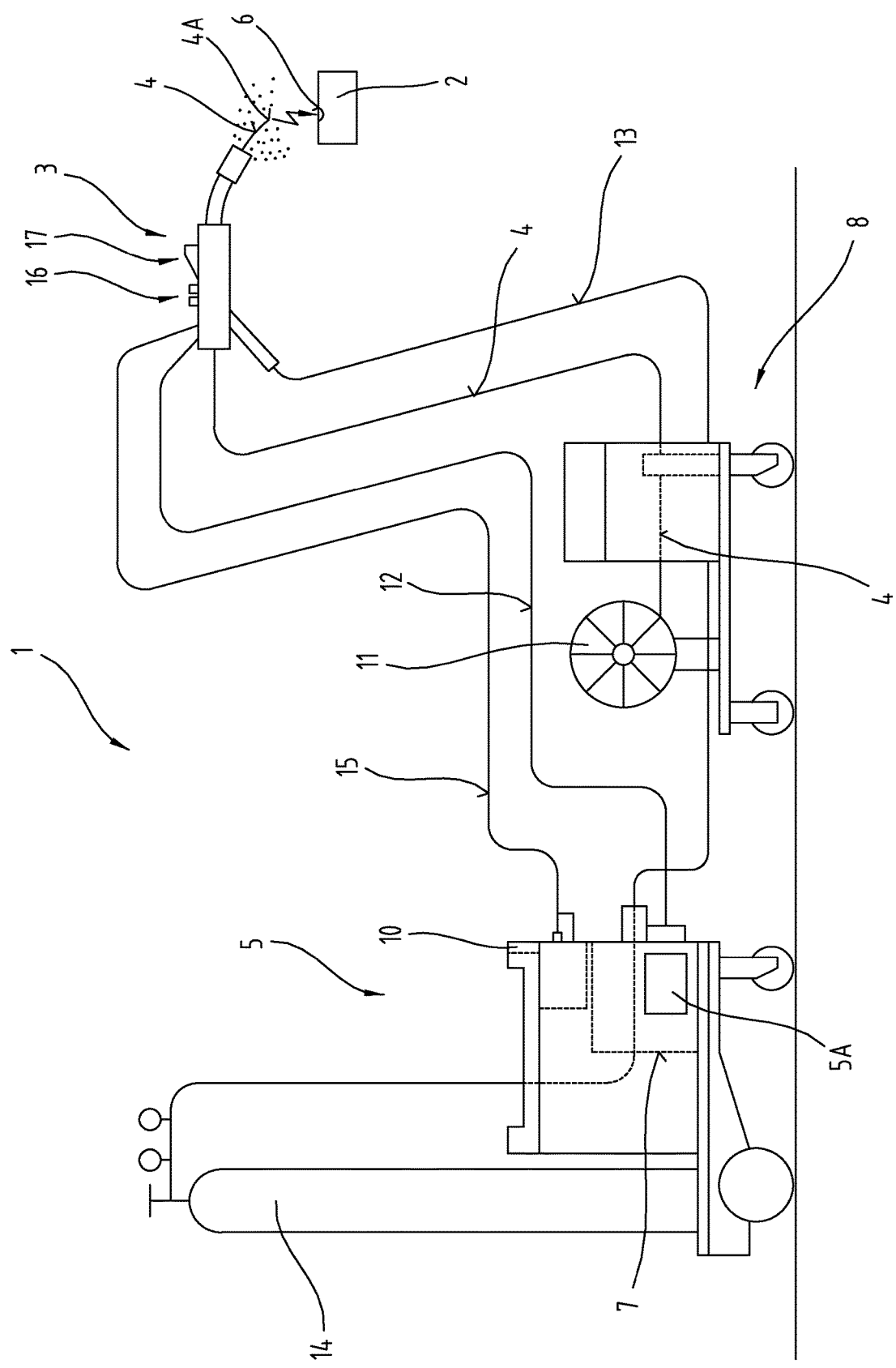
FIG. 2 is a drawing of a possible embodiment of a welding system according to the invention comprising a marking device for marking a workpiece surface of a metal workpiece.

FIG. 2 schematically shows an embodiment of a welding system 1 which contains a marking device according to the invention. The welding system 1 shown in FIG. 2 is suitable for various welding methods, in particular for MIG/MAG welding methods. The welding system 1 makes it possible to mark a workpiece surface 2A of a metal workpiece 2. In this context, a welding torch 3 of the welding system 1 comprising a welding wire electrode 4 is guided along the workpiece surface 2A to be marked. The wire end 4A of the welding wire electrode 4 is moved towards and away from the workpiece surface 2A to be marked. The welding wire electrode 4 can be the meltable welding wire electrode of the subsequent welding process. However, it is also possible to use a welding wire electrode 4, for example made of tungsten, which is only employed for the marking process. The welding system 1 possesses a welding power source 5 comprising a power unit 5A. The welding system 1 further possesses a control device 7. The control device 7 is for actuating the power unit 5A of the welding power source 5 and for actuating a wire advancement apparatus 8 which conveys the welding wire electrode 4. In this context, the welding wire electrode 4 can be unwound from a reserve drum 11 of the welding system 1. In one possible embodiment, a current for producing electric sparks in a marking process or for producing an arc in a subsequent welding process can be supplied from the power unit 5A of the welding power source 5 via a current supply line 12 to the welding torch 3 or to the welding wire electrode 4 guided therein. The power circuit is closed by way of a line (not shown in greater detail) from the workpiece 2 to the power unit 5A.

The appearance of the marking track can be influenced using the composition of the protective gas. Generally speaking, as the active proportion increases, in other words $CO_2$ or oxygen, the marking track becomes darker and narrower. If pure argon (inert gas) is used, the marking track is relatively bright and wide on all surface, the width decreasing as the speed increases. Without protective gas, the marking path is dark and narrow, and the width does not change with the speed.

Without protective gas, oxidation can result in undesired formation of an insulating surface, in particular if the electrode consists of aluminium or an aluminium alloy. This results in the danger of a short circuit being detected, and this can disrupt the marking process.

In the embodiment shown in FIG. 2, the welding torch 3 additionally has a supply line 13 for a protective gas. During the marking of the workpiece surface 2A of the metal workpiece 2, the workpiece surface 2A can be protected from oxidation by a supplied protective gas. In one possible embodiment, this protective gas is drawn from a protective gas store 14 of the welding system 1, as shown in FIG. 2. In the embodiment shown in FIG. 2, the welding wire electrode unwound from the reserve drum 11 by the wire advancement apparatus 8 is supplied to the welding torch 3 through a power line 12, the wire end 4A of the welding electrode 4 protruding from the welding torch 3 and being moved back and forth in a reversing manner during the marking process.

In the embodiment shown in FIG. 2, the welding torch 3 is further connected via a line 15 to a cooling circuit of the welding system 1. In the embodiment shown in FIG. 2, the welding system 1 has, at the welding power source 5, a user interface 10 comprising an input and/or display device. Further, an input device 16 and an output device 17 may be provided at the welding burner 3 of the welding system 1, as is shown in FIG. 2. In one possible embodiment, the user or welder has the option of switching between a marking mode of operation and a welding mode of operation of the welding system 1 at the user interface 10 and/or at the input device 16 of the welding torch 3 or choosing between the welding method or the marking method at the user interface. Further, the user has the option of setting different marking parameters for the marking process by way of the user interface 10 at the welding power source 5. In one possible embodiment, these marking parameters are the voltage and/or current level controlled by the welding power source 5, a movement profile and/or the movement frequency f of the welding wire electrode 4 and/or the movement speed of the welding torch 3, with which a wire end 4A of the welding wire electrode 4 is guided along the workpiece surface 2A of the workpiece 2. In one possible embodiment, the welding torch 3 of the welding system 1 shown in FIG. 2 is guided by a robot arm 3A. Alternatively, the welding torch 3 of the welding system 1 shown in FIG. 2 can be hand-guided by a user during a marking process.

FIG. 3A, 3B, 3C show progressions over time to illustrate the functionality of the marking method according to the invention. FIG. 3A shows the wire advancement speed $V_D$ of the welding wire electrode 4 over time. FIG. 3B shows a current I flowing through the welding wire electrode 4. FIG. 3C shows a voltage U present at the welding wire electrode 4.

As can be seen in FIG. 3A, the welding wire electrode 4 is moved back and forth; in other words, the welding wire electrode 4 alternately has a positive wire advancement speed $V_D$ and a negative wire advancement speed $V_D$, as shown in FIG. 3A. In FIG. 3A, 3B, 3C, one time interval is shown extended, as indicated by symbolic magnifying glass L. During the marking process, the welding wire electrode 4 in the lifted-off state is moved forwards towards the workpiece surface 2A of the workpiece 2 at the time t1. In this context, a voltage U is applied to the welding wire electrode 4 so as to be able to detect the short circuit occurrence at time t2 by way of the voltage drop. If a contact of the welding wire electrode 4 with the workpiece surface 2A of the metal workpiece 2 is established, the wire advancement speed $V_D$ is reduced; in other words, the welding wire electrode 4 is braked. In this context, the contact of the welding wire electrode 4 with the workpiece surface 2A can be established by the detection a short circuit, by an increase in the motor current or motor torque of the wire advancement, or else by calculating the distance travelled. If a short circuit occurs, the voltage drops in a clearly detectable manner. A relatively smaller, more measurable current I1 is imposed so as to continue to detect the contact of the welding wire electrode 4 with the workpiece surface 2A. For a predetermined first time period Δt1, preferably 400 us, after the short circuit occurs, this current I1 does not exceed a predetermined first current level I1, preferably 30A. This is intended to prevent the wire electrode from sticking. At the time t3, the wire advancement speed $V_D$ becomes negative; in other words, the welding wire electrode 4 is moved backwards away from the workpiece surface 2A. The wire end 4A of the welding wire electrode 4 is repeatedly moved towards the workpiece surface 2A until an electric short circuit with the metal workpiece 2 occurs. As soon as the electric short circuit with the metal workpiece 2 occurs, the wire end 4A of the welding wire electrode 4 is moved away from the workpiece surface 2A. At the time t4 before the short circuit interruption t5 brought about by the welding wire electrode 4 being lifted off, the current I is set to a predetermined second current level I2, preferably greater than 10 A, to ensure ignition of a spark when the short circuit is interrupted. If the time t4 is only just before the time t5 of the short circuit interruption, the time t5 can be predetermined on the basis of the movement profile of the welding wire electrode 4. At the time t5, a spark is ignited, as shown in FIG. 3B; in other words, an electric spark occurs and brings about material removal and/or material alteration in a point-based manner on the workpiece surface 2A of the metal workpiece 2 to generate a marking point 6. As is represented in FIG. 3B by the hatched area A, after the short circuit is interrupted the spark is maintained in accordance with a predetermined current and time profile. The manifestation of marking point is influenced by way of the energy of the spark, which is proportional to the area A in the graph of the current progression over time. Current-time areas favourable for marking points are between 100 $\mu$As and 20 $\mu$As. As a result of the voltage U falling below a predefined threshold Us, the spark is extinguished at the time t6. Preferably, Us is below 12 V. Thereupon, the current I through the welding wire electrode 4 falls to zero, as can be seen in FIG. 3B. The time period between the ignition and extinction of sparks can be set for example using the aforementioned current-time profile. Once the wire advancement speed $V_D$ passes back from the rearward movement to the forward movement or the current has fallen to 0 A, the voltage U is increased again, as is shown in FIG. 3C, and remains at the increased voltage level, so as reliably to detect the next short circuit due to the contact of the welding wire electrode 4 with the workpiece surface 2A. This is represented in FIG. 3C at the time t7 at which the wire advancement speed $V_D$ becomes positive again. The process repeats cyclically.

FIG. 4A, 4B, 4C show progressions over time to illustrate the functionality of the marking method according to the invention. FIG. 4A shows the wire advancement speed $V_D$ of the welding wire electrode 4 over time. FIG. 4B shows a current I flowing through the welding wire electrode 4. FIG. 4C shows a voltage U present at the welding wire electrode 4. As an alternative to the embodiment of FIG. 3A-3C, the current I in these progressions over time increases in a ramp-shape after the short circuit occurs at the time t2. In this case too, for a particular first time period Δt1, preferably 400 us, after the short circuit occurs, the current I does not exceed a predetermined first current level I1, preferably 30 A. In FIG. 4B, a level of approximately 20 A for I1 is plotted for this. At the time t4 before the short circuit interruption t5 brought about by the welding wire electrode 4 being lifted off, the current I is set to at least a predetermined second current level I2. In the embodiment, the value for I2 results from a further linear rise in the ramp. In the voltage progression in FIG. 4C, as an alternative to FIG. 3C, the voltage U at the time t1 or t7 for detecting a recent short circuit occurrence is greater than the voltage U in the spark phase t5-t6. This can simplify detecting the short circuit occurrence.

Using the marking method according to the invention, it is possible to mark the position of a weld seam, which is subsequently to be carried out, along a welding path or weld seam, it being possible for this actual position to be visually checked, in an automated manner or else manually. In series production, a deviation from a desired welding path can be checked and corrected by random sampling. A marking path of a different contrast level can be applied to metal surfaces by varying the marking parameters.

The marking method according to the invention is suitable in particular for CMT welding systems, since no additional hardware components are required for carrying out the marking method.

For marking the workpiece surface 2A, the welding wire electrode 4 is preferably moved back and forth perpendicular to the workpiece surface 2A. Alternatively, the torch positioning angle with respect to the workpiece surface 2A of a potentially following welding process may also specify the movement direction of the welding wire electrode 4. The marking method according to the invention makes it possible to simulate the welding processes in a "dry run" before the actual welding process. For different weld seams, for example rising weld seams or falling weld seams, different marking parameters can be used for simulating the relevant welding process. The method according to the invention is suitable predominantly for assisting automated welding, but can also be used in hand welding apparatuses for marking or labelling workpieces 2. Further, the marking method according to the invention can be used for teaching purposes, so as acoustically to illustrate welding parameters such as positioning angle, melting power, corrections etc.

The invention comprises the following embodiments:

1. Method for marking a workpiece surface (2A) of a metal workpiece (2), in which a welding torch (3) comprising a welding wire electrode (4) is guided along the workpiece surface (2A) to be marked and meanwhile a wire end (4A) of the welding wire electrode (4) is moved towards and away from the workpiece surface (2A) to be marked, wherein an electric voltage (U) present at the welding wire electrode (4) and/or an electric current (I) flowing through the welding wire electrode (4) bring about electric sparks, which bring about material removal and/or material alteration at the workpiece surface (2A) of the metal workpiece (2) to mark the workpiece surface (2A).

2. Method according to embodiment 1, wherein the welding wire electrode (4) consists of an additive material which can be melted during a welding process.

3. Method according to either embodiment 1 or embodiment 2, wherein the wire end (4A) of the welding wire electrode (4) is repeatedly moved towards the workpiece surface (2A) until an electric short circuit with the metal workpiece (2) occurs and subsequently moved away from the workpiece surface (2A), an electric spark being produced each time the electric short circuit is interrupted and bringing about material removal and/or material alteration in a point-based manner on the workpiece surface (2A) of the metal workpiece (2) to generate a marking point (6).

4. Method according to embodiment 3, wherein the marking points (6) generated at the workpiece surface (2A) of the metal workpiece (2) form a marking path which is visible in the workpiece surface (2A).

5. Method according to any of preceding embodiments 1 to 4, wherein the electric voltage (U) present at the welding wire electrode (4) and/or the electric current (I) flowing through the welding wire electrode (4) are controlled by a welding power source (5) of a welding system (1), which power source is connected to the welding wire electrode (4), to adjust the material removal and/or material alteration brought about at the workpiece surface (2A) of the metal workpiece (2).

6. Method according to any of preceding embodiments 1 to 5, wherein a movement profile and/or movement frequency of the wire end (4A), which is moveable towards and away from the workpiece surface (2A) to be marked, of the welding wire electrode (4) is adjusted.

7. Method according to any of preceding embodiments 1 to 6, wherein a movement speed and/or movement path of the welding torch (3), with which the wire end (4A) of the welding wire electrode (4) is guided along the workpiece surface (2A) to be marked of the metal workpiece (2), is adjusted.
8. Method according to embodiment 1 to 7, wherein the marking points (6) and/or marking paths generated at the workpiece surface (2A) of the metal workpiece (2) are used for displaying data, in particular for labelling the workpiece (2) and/or for identifying the workpiece (2) with a code, in particular a QR code.
9. Method according to any of preceding embodiments 1 to 8, wherein during the marking the wire end (4A), which moves back and forth, of the welding wire electrode (4) is guided along a programmed target progression of a weld seam which is to be produced in a subsequent welding process.
10. Method according to embodiment 9, wherein a deviation between the actual progression of a marking path and the target progression of the weld seam is measured for quality control and/or readjustment of welding torch guidance.
11. Method according to any of preceding embodiments 1 to 10, wherein a contrast level of a marking path produced on the workpiece surface (2A) is adjusted by altering marking parameters, which include the voltage and/or current level controlled by a welding power source (5), the movement profile and/or movement frequency of the welding wire electrode (4), and/or the movement speed of the welding torch (3) with which the wire end (4A) of the welding wire electrode (4) is guided along the workpiece surface (2A).
12. Method according to embodiment 11, wherein the marking parameters used during the marking of the workpiece surface (2A) are stored in a data store (9) of the welding system (1) as a dataset and read out from the data store (9) of the welding system (1) again for a subsequent marking process.
13. Method according to embodiment 12, wherein for different contrast levels of a marking path formed on the workpiece surface (2A) and/or for different materials of the metal workpiece (2) and/or for different welding wire electrodes (4) an associated dataset of suitable marking parameters is read out from the data store (9) of the welding system (1) to mark the workpiece surface (2A) of the metal workpiece (2).
14. Method according to any of preceding embodiments 1 to 13, wherein the workpiece surface (2A) is protected from oxidation by supplied protective gas during the marking of the workpiece surface (2A) of the metal workpiece (2).
15. Method according to any of preceding embodiments 1 to 14, wherein during the marking of the workpiece surface (2A) the welding torch (3) is automatically guided by a robot arm in accordance with a programmed target progression of a weld seam which is to be produced in a subsequent welding process.
16. Method according to any of preceding embodiments 1 to 14, wherein the welding torch (3) is hand-guided during the marking of the workpiece surface (2A), in particular to label the workpiece surface (2A).
17. Marking device for marking a workpiece surface (2A) of a metal workpiece (2), wherein a welding torch (3) comprising a meltable welding wire electrode (4) of a welding system (1) can be guided along the workpiece surface (2A) to be marked of the metal workpiece (2), and meanwhile the marking device is suitable for moving a wire end (4A) of the meltable welding wire electrode (4) towards and away from the workpiece surface (2A) to be marked so as to produce electric sparks, which bring about material removal and/or material alteration at the workpiece surface (2A) of the metal workpiece (2) to mark the workpiece surface (2A).
18. Marking device according to embodiment 17, wherein the welding wire electrode (4) is connected to a welding power source (5) of the welding system (1), which power source controls an electric voltage (U) present at the welding wire electrode (4) and/or an electric current (I) flowing through the welding wire electrode (4) to adjust the material removal brought about at the workpiece surface (2A) of the metal workpiece (2).
19. Marking device according to either embodiment 17 or embodiment 18, wherein the wire end (4A) of the welding wire electrode (4) protrudes from a guided welding torch (3) of the welding system (1) and can be moved back and forth, during the marking of the workpiece surface (2A), with an adjustable movement profile and/or adjustable movement frequency with respect to the workpiece surface (2A) to be marked.
20. Use of the marking device according to any of preceding embodiments 17 to 19, for simulating a subsequent welding process using a visual and/or acoustic signal.
21. Welding system (1) comprising a marking device according to any of preceding embodiments 17 to 19.

The invention claimed is:
1. A method for marking a workpiece surface of a metal workpiece, in which a welding torch comprising:
  guiding a meltable welding wire electrode along the workpiece surface to be marked;
  applying an electric voltage at the welding wire electrode and/or an electric current flowing through the welding wire electrode sufficient to enable the welding wire electrode to generate electric sparks, which sparks cause material removal and/or material alteration at the workpiece surface of the metal workpiece to mark the workpiece surface; and
  while the welding wire electrode is guided along the workpiece surface, repeatedly moving the wire end of the welding wire electrode towards the workpiece surface until an electric short circuit with the metal workpiece occurs and then subsequently moving the wire end away from the workpiece surface to interrupt the short circuit;
  wherein an electric spark is produced each time the electric short circuit is interrupted to bring about material removal and/or material alteration in a point-based manner on the workpiece surface of the metal workpiece to generate one or more marking points, with no melting of the meltable welding wire electrode taking place.
2. The method according to claim 1, wherein the welding wire electrode includes an additive material which can be melted during a welding process.
3. The method according claim 1, wherein the one or more marking points generated at the workpiece surface of the metal workpiece form one or more marking paths visible in the workpiece surface.
4. The method according to claim 1, wherein the electric voltage present at the welding wire electrode and/or the electric current flowing through the welding wire electrode are controlled by a welding power source of a welding system, which power source is connected to the welding wire electrode, to adjust the material removal and/or material alteration brought about at the workpiece surface of the metal workpiece.

5. The method according to claim 1, wherein a movement profile and/or movement frequency of the wire end, which is moveable towards and away from the workpiece surface to be marked, of the welding wire electrode is adjusted.

6. The method according to claim 1, wherein a movement speed and/or movement path of the welding torch, with which the wire end of the welding wire electrode is guided along the workpiece surface to be marked of the metal workpiece, is adjusted.

7. The method according to claim 1, wherein the one or more marking points generated at the workpiece surface of the metal workpiece are used for displaying data, in particular for labelling the workpiece and/or for identifying the workpiece with a code.

8. The method according to claim 1, wherein during the marking the wire end, which moves back and forth, of the welding wire electrode is guided along a programmed target progression of a weld seam which is to be produced in a subsequent welding process.

9. The method according to claim 8, wherein a deviation between the actual progression of a marking path and the target progression of the weld seam is measured for quality control and/or readjustment of welding torch guidance.

10. The method according to claim 3, wherein a contrast level of a marking path of the at least one marking path produced on the workpiece surface is adjusted by altering marking parameters, which include the voltage and/or current level controlled by a welding power source, the movement profile and/or movement frequency of the welding wire electrode, and/or the movement speed of the welding torch with which the wire end of the welding wire electrode is guided along the workpiece surface.

11. The method according to claim 10, wherein the marking parameters used during the marking of the workpiece surface are stored in a data store of the welding system as a dataset and read out from the data store of the welding system again for a subsequent marking process.

12. The method according to claim 11, wherein for different contrast levels of said marking path formed on the workpiece surface and/or for different materials of the metal workpiece and/or for different welding wire electrodes an associated dataset of suitable marking parameters is read out from the data store of the welding system to mark the workpiece surface of the metal workpiece.

13. The method according to claim 1 wherein the workpiece surface is protected from oxidation by supplied protective gas during the marking of the workpiece surface of the metal workpiece.

14. The method according to claim 1, wherein during the marking of the workpiece surface the welding torch is automatically guided by a robot arm in accordance with a programmed target progression of a weld seam which is to be produced in a subsequent welding process.

15. The method according to claim 1, wherein the welding torch is hand-guided during the marking of the workpiece surface to label the workpiece surface.

16. A welding system comprising:
a marking device for marking a workpiece surface of a metal workpiece;
a welding torch, comprising a meltable welding wire electrode;
a welding power source; and
a control system configured and operable to guide the welding torch along the workpiece surface to be marked of the metal workpiece while moving a wire end of the meltable welding wire electrode, which protrudes from the welding torch, towards and away from the workpiece surface to be marked so as to produce electric sparks;
wherein the control system is further configured and operable to;
control the welding power source to adjust the electric voltage present at the welding wire electrode and/or to adjust the electric current flowing through the welding wire electrode, and
control a movement profile and/or movement frequency of the wire end, in such a way that the wire end is repeatedly moved towards the workpiece surface until an electric short circuit with the metal workpiece occurs and then subsequently moved away from the workpiece surface to interrupt the short circuit so that an electric spark is produced each time the electric short circuit is interrupted to cause material removal and/or material alteration in a point-based manner on the workpiece surface of the metal workpiece to generate a marking point, with no melting of the meltable welding wire electrode taking place.

17. A method for using the welding system according to claim comprising simulating a subsequent welding process using a visual and/or acoustic signal.

18. The method according to claim 3, wherein the one or more marking paths generated at the workpiece surface of the metal workpiece are used for displaying data, in particular for labelling the workpiece and/or for identifying the workpiece with a code.

19. The method according to claim 18, wherein said code is a QR code.

20. The method according to claim 7, wherein said code is a QR code.

* * * * *